FOUR COLOR REPRODUCING METHOD AND APPARATUS
Filed June 15, 1955 4 Sheets-Sheet 1
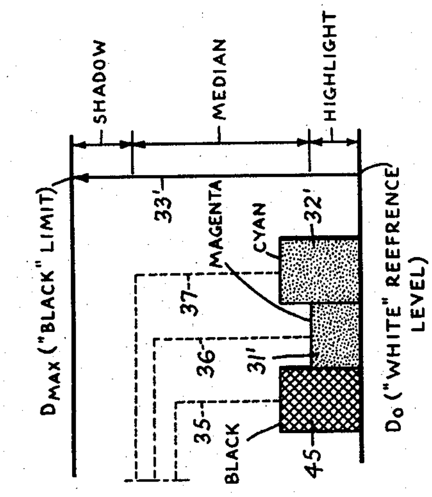
FIG. IC.
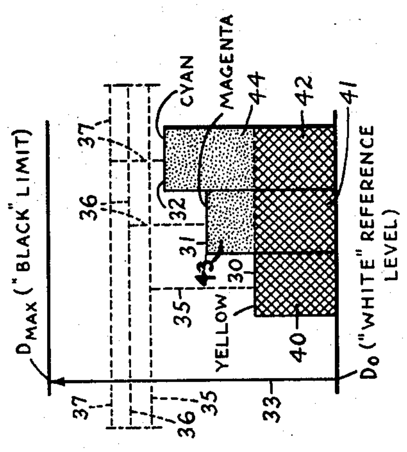
FIG. IB.
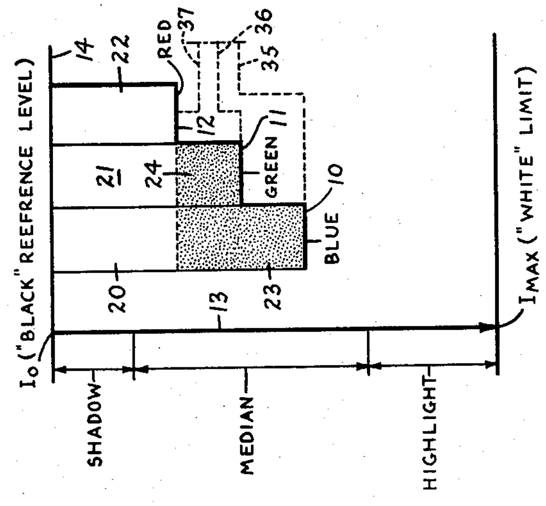
FIG. IA.
INVENTORS
WILLIAM WEST MOE
JOSEPH GRANT JORDAN
BY Campbell, Brumbaugh, Free and Graves
THEIR ATTORNEYS INVENTORS
WILLIAM WEST MOE
JOSEPH GRANT JORDAN
BY Campbell, Brumbaugh, Free and Graves
THEIR ATTORNEYS INVENTORS
WILLIAM WEST MOE
JOSEPH GRANT JORDAN
BY Campbell, Brumbaugh, Free and Graves
THEIR ATTORNEYS INVENTORS
WILLIAM WEST MOE
JOSEPH GRANT JORDAN
BY Campbell, Brumbaugh, Free and Graves
THEIR ATTORNEYS United States Patent Office 2,947,805

Patented Aug. 2, 1960

2,947,805

FOUR COLOR REPRODUCING METHOD AND APPARATUS

William West Moe, Stratford, and Joseph Grant Jordan, Stamford, Conn., assignors to Time, Incorporated, New York, N.Y., a corporation of New York Filed June 15, 1955, Ser. No. 515,664

13 Claims. (Cl. 178—5.2)

This invention relates generally to methods and apparatus involved in reproducing a colored visual subject as a print done in multicolored inks including black ink. More particularly, this invention relates to methods and apparatus of the mentioned character which have the end of providing an ink print appearing as a realistic reproduction of the original to the human eye. In furtherance of this end, the methods and apparatus of the present invention determine the amount of black ink laid down in the print as a function of one or more of the values of certain parameters of a color.

For a better understanding of the description to follow, reference is made to the accompanying drawings wherein:

Figs. 1A, 1B and 1C are bar diagrams of the color relations involved in the present invention;

Figure 2:
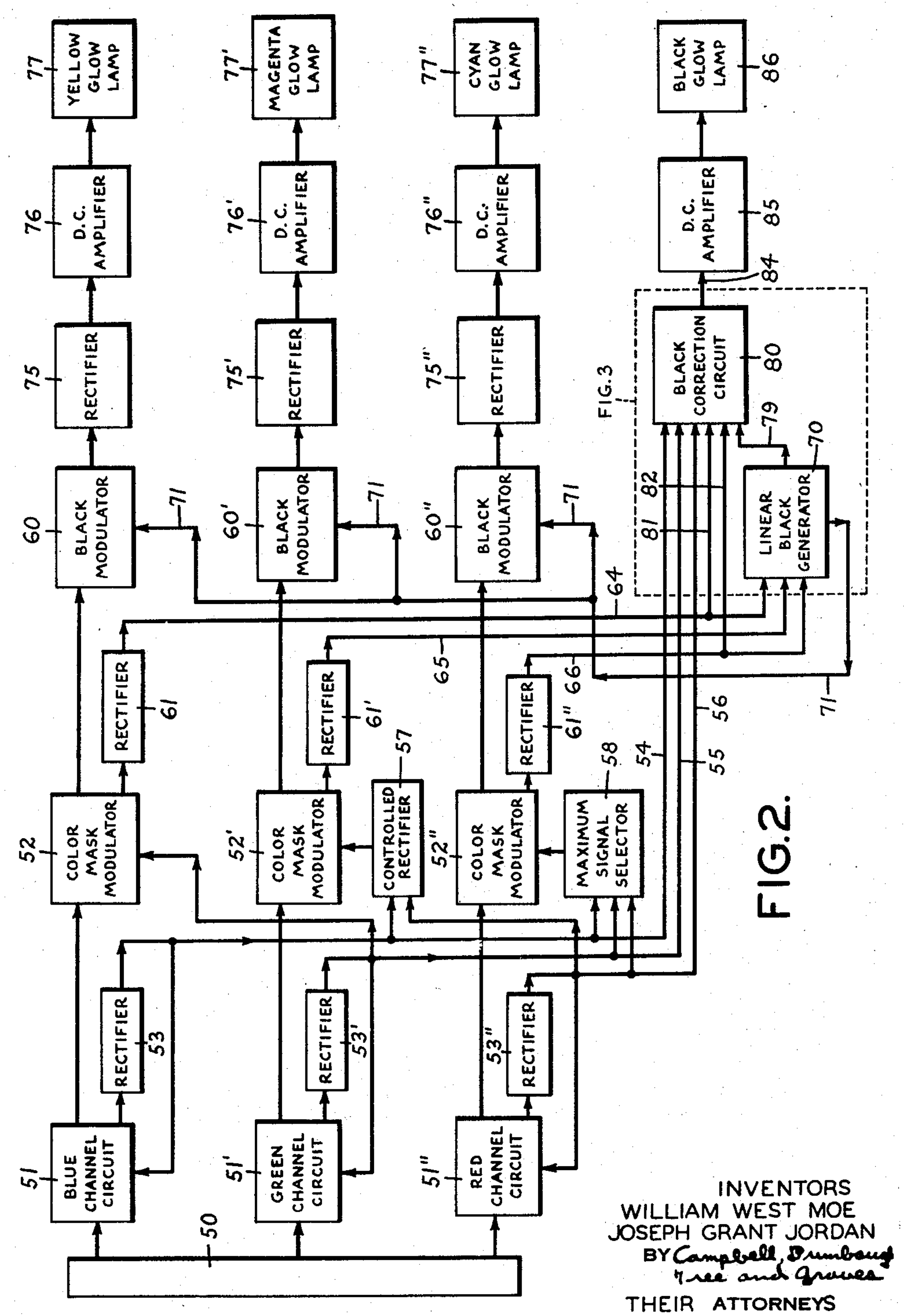
Fig. 2 is a schematic block diagram of apparatus incorporating the present invention.

Apparatus has previously been disclosed wherein an original colored subject is scanned by a light beam which analyzes the original in terms of its elemental areas. The light from each elemental area is split into three beams which are respectively passed through three filters transmitting different ranges of wavelengths in the visible spectrum. These wavelength ranges are mutually related in spectrum position to permit a reasonably satisfactory re-synthesis of the gamut of original colors from the light beam components into which the original colors are analyzed by the filters. Preferably the filters are "blue," "green" and "red" filters (i.e., the light transmitted by the filters is seen subjectively as blue, green and red) inasmuch as the named filters give the best reproduction in colored ink of a colored original subject.

It will be understood that the light which has passed, say, the blue filter is not monochromatic, but instead comprehends a whole range of wavelengths which together subjectively give the impression of blue. It will also be understood that the transmission characteristics of the filters are not ideal in the sense that the blue filter, say, gives zero attenuation over a specifiable range of wavelengths and infinite attenuation to either side of this range, or that the range of wavelengths transmitted by the blue filter does not overlap somewhat (or possibly fall short somewhat) of the wavelength ranges transmitted by the green and red filters.

Thus, to refer to signals derived from the light beams which have passed the said filters as "blue color," "green color" and "red color" signals is to use these terms as a convenient convention of the art rather than as terms indicating that, say, the blue color signal is related in a physical sense to some actual blue color which is an additive primary component of colors in the original. Such signals will be so referred to, however, for the reason that it permits of simplified explanation in a manner which is understood by the art. Also, as a reasonable working approximation, the blue color signal will be treated of as derived from a light beam composed entirely of light of a certain dominant "blue" wavelength in the beam.

The filtered beams impinge upon respective photosensitive devices which generate electric color signals manifesting in amplitude the intensities of the light beams to which they respectively correspond. These signals are amplified and considerably modified in three separate channels. At the channel outputs the three signals respectively excite yellow, magenta and cyan glow lamps to each emit a light of an intensity which varies with the amplitude of the exciting signal.

The luminous emissions from the glow lamps are formed into reproducing light beams which scan in synchronism with the original scanning beam and to which sheets of photosensitive material are exposed which, when developed, provide three color separation negatives. From these negatives are produced corresponding half-tone printer plates which are thereafter respectively inked with yellow, magenta and cyan ink. The final color reproduction is obtained by transferring in superposition the three ink images on the half-tone plates onto an ink receiving medium such as white paper.

The yellow, magenta and cyan ink colors are denoted "subtractive" primary colors herein by virtue of their association in this instance with printing inks which characteristically have a "subtractive" or light absorbing effect. The subtractive primary colors in a general sense bear a reciprocal relation to the intensities of the filtered light beams. For example, yellow ink appears yellow by absorbing the blue component of impinging white light while reflecting the red and green components thereof, the last two components together being seen as the color yellow by the human eye. Hence, a large amount of blue light is manifested as a low amount of yellow ink on the printed reproduction. Similar reciprocal relations exist between the intensities of the green and red light beams derived from the original and the respective amounts laid down of the magenta and cyan inks. In practice, the reciprocal relations just described are obtained in the course of inversion of a negative into a half-tone plate. While the density of a given area on the negative varies directly with the amplitude of the color signal which excites the glow lamp to expose the area, the amount of ink laid down in the corresponding area of the plate varies inversely with the negative density in the given area.

It is possible to reproduce, within limits, any color in the original by combining inks of the three subtractive primary colors, yellow, magenta and cyan. In such three color system the only purpose served at a given point on the print by the colored ink of lowest intensity is to combine with equivalent amounts of the other two colored inks to give the effect of black in the print. This black effect together with the white background of the print represents a shade of gray in visual terms.

It is consequently common to utilize a four color reproducing system wherein black ink is employed in addition to the colored inks to reproduce the colors of the original. In such four color system the black ink is substituted for all or a part of the ink whose density in a three color system is lowest. The quantities of the other two colored inks are reduced by an amount equal, in first approximation, to the amount of black ink laid down.

To the end of depositing such black ink in appropriate amounts, the previously disclosed apparatus incorporates a "black" channel wherein a "black" signal is developed as a function of the maximum one of the color signals, and wherein a "black" glow lamp is excited by the "black" signal to expose a separation negative from which is produced a "black" half-tone printer plate. The term "linear black" is utilized to denote this black signal, and the black ink deposited as a consequence thereof.

Referring to Figs. 1A, 1B and 1C which illustrate the above-described and other color relations, the light beams of blue, green and red dominant wavelengths into which a color on the original subject can be considered analyzed are shown (Fig. 1A) as the bars 10, 11 and 12. The value of the parameter, intensity, is represented by the percentage extent of the bars on an intensity scale, represented by arrow 13, and going from an $I_0$ (zero intensity) or "black" reference level 14 towards an $I_{max}$ (maximum intensity) or "white" limit. An increase in intensity of the original color itself is manifested by an increase in percentage extent on the scale of all three bars 10, 11, 12.

Regarding the other parameters, dominant wavelength and purity, the amount of light of the beam of lowest intensity value can be considered to combine with equivalent amounts of light of the other two beams to form an achromatic content for the original color. In Fig. 1A this achromatic content is formed by the portions of blue, green and red light represented by the plain sections 20, 21 and 22 of the bars 10, 11 and 12. This achromatic content in a physical sense is equivalent to white light of a specifiable intensity value on the intensity scale. Since the achromatic content is "white" superimposed in varying amounts on a "black" reference level, the achromatic content may be throught of in a visual sense as a range of shades extending from black at $I_0$ through various shades of gray to the "white" at $I_{max}$.

The chromatic content of an original color is represented by the amount of blue, green or red light which is left over after the achromatic content has been formed. Thus, for the original color represented by the bars 10, 11 and 12 in Fig. 1A, the chromatic content is represented by the respective stippled sections 23 and 24 of the blue and green bars 10 and 11. To a reasonable approximation the chromatic content can be thought of as being constituted entirely of light of one dominant wavelength. Chromatic content may be correlated to an extent with the subjective property of hue.

The purity of a color is defined herein as the ratio of chromatic content to chromatic content plus achromatic content. Thus, if an original color has 100% purity, it follows that the lowest intensity light beam has zero value on the intensity scale. Conversely, if an original color has 0% purity, it follows that all three of the blue, green and red light beams thereof have equal values on the intensity scale.

Figs. 1B and 1C respectively represent the three color mode and the four color mode for reproducing (by colored inks on a print) the original color represented by the bars 10, 11, 12 in Fig. 1A. In Fig. 1B, the bars 30, 31 and 32 represent the densities of the yellow, magenta and cyan inks on a density scale represented by the arrow 33 and extending from a $D_0$ (zero density) or "white" reference level to a $D_{max}$ or "black" limit. The $D_0$ level is formed by the white background on the print on which the colored inks are deposited. It will be realized that the density scale also represents an intensity scale for the yellow, magenta and cyan light reflected from the printed reproduction. Because the background of the print may not reflect white light with an intensity equal to that which white light has at the "white" limit (Fig. 1A) for the original subject, and because the inks used on the print may not, even with maximum density, reach the "black" reference level (Fig. 1A) of the original subject, the range 33 as an intensity range is usually more restricted than the intensity range 13 for the original subject.

The relations between the light beams, blue, green and red, and the reciprocal subtractive primary colors, yellow, magenta, and cyan, are represented by the dotted lines 35, 36 and 37. These lines indicate a variation in opposite sense of the intensity of light of a given color and of the density of the ink of the reciprocal subtractive color. For example, as the intensity of blue light (Fig. 1A) increases, the density of the yellow ink (Fig. 1B) decreases.

In Fig. 1B, the three color amounts of yellow, magenta and cyan inks which combine to form the equivalent of black are shown by the cross-hatched portions 40, 41 and 42 of the bars 30, 31 and 32, while the amounts which do not so combine are represented by the respective stippled portions 43 and 44 of the magenta and cyan bars 31 and 32.

The four color mode of color reproduction (Fig. 1C) differs from the three color mode of reproduction (Fig. 1B) in that the amounts 40, 41, 42 of the colored inks which trichromatically represent black are replaced by black ink which, as represented by the bar 45, has the same density value as these three color amounts. Accordingly, the original color whose additive components are shown in Fig. 1A is reproduced with four colors (Fig. 1C) by reducing the yellow ink density by an amount giving zero density therefor, and by reducing the magenta and cyan inks by the same amount so that the densities of these inks equal (as represented by the stippled areas 43', 44', within the bars 31', 32') the color-forming amounts 43, 44 of these same inks when used trichromatically. As disclosed in United States Patent 2,605,348, issued on July 29, 1952, in the name of Vincent C. Hall et al., it is often preferable that the colored inks be not reduced in density in 1:1 ratio with the density of the black ink deposited.

In connection with the above discussion, the "intensity" of a color is an expression of the energy content of light of that color. The human eye, however, is not equally sensitive for different colors to light having the same energy content. Thus, the subjective property of "visual brightness" differs from the objective property of "intensity". By combining 5%, 75%, 20%, respectively, of the blue, green and red color signals in the separate color channels, there may be obtained a resultant signal representing, to an approximation, the integrated visual brightness of the color.

Considering the problems dealt with by the present invention, in the shadow end of the intensity scale, considerable areas of an original in the form of a transparency appear black or completely opaque to the human eye. However, the very long linear response of the photomultipliers, as compared with the eye, analyze the shadows on the original in terms of actual color components. Since these deep shadows are, in practice, usually not neutral, but colored, at least one of the reproducing light beams will be considerably in excess of the other two beams. This relative excess of the first beam over the second and third beams gives the result on the print that the densities of the colored inks called for by the second and third beams are substantially in excess of the amount by which the densities of these colored inks are reduced as a function of the density value of black ink called for by the first beam. Accordingly, the colored inks are not reduced to zero density value, and the amounts of these inks which are left over and appear on the print are sufficient to give the printed shadow a colored tone which renders the shadow unrealistic in appearance.

Also, in the shadow region, there is attainable on the print only a limited range of variation in purity for the reproduced colors. Because of this limited variation, it is much harder in the shadow region than in the median region for the human eye to distinguish between two reproduced tones which are distinct on the original only because they are somewhat separated in purity value. In many instances, however, it is just this ability to distinguish between such tones which enables the eye to see the spatial details in the shadows of the reproduced subject. For a realistic reproduction, it has been found more important to preserve the spatial details in the shadow than to preserve the original balance of purities of the shadow tones.

As another problem, it has been found, in reproducing a color on the print, that light of the wave-lengths predominantly absorbed by the lowest density ink (e.g., "blue" light for cyan ink) is also partially absorbed by the higher density inks to result in a disproportionately large absorption of these wavelengths. This disproportionate absorption by the inks in allowed for by electronic color masking of the color signals. This masking relatively increases the largest value signal to lower the density of the lowest density ink so that the absorbed wavelengths corresponding thereto are absorbed only in proper amount by the over-all absorption of all three inks. In the highlight region, however, the increase in the largest value or third color component signal is sufficient to decrease to zero the density of the corresponding subtractive color ink. Since the third color component signal determines in like manner the magnitude of the black printer signal, the density of the black ink laid down will likewise be reduced to zero with the result that the black plate prints in practical printing processes only a uniform highlight dot. Since this third color often carries the apparent detail, the apparent detail will be lost in the highlights and the print has a "flat" or characterless appearance.

As a third problem it has been found empirically that, if the black ink is laid down in a manner which does not take into account the dominant wave-length of the chromatic content of the color to be reproduced, the black ink to an extent degrades reproduced colors if the dominant wavelength for their chromatic content lies within a certain range. This degrading is not visually noticeable to an undesirable extent where the color is of blue or bluish-purple hue. The degrading by the black ink is, however, clearly noticeable as a "muddy" appearance in the yellow or yellowish-red hues. With such hues, the degrading effect is most noticeable when the color has high purity. As the purity decreases, the degrading effect becomes a less and less important consideration. Accordingly, when the color reaches 0% purity, the color is a gray shade having no chromatic content, and, accordingly, no correction for degrading is necessary.

It is an object of the invention accordingly, to provide a mode of four color reproduction of a colored original in such manner that the printed reproduction, as a first effect, will be corrected to eliminate color toning of shadows and to bring out spatial details in the shadow region which are represented by tones of different purity values.

Another object of the invention is to provide reproduction of the above-noted character in such manner that, as a second effect, the apparent detail will be preserved in highlight areas on the printed reproduction.

Another object of the invention is to provide reproduction of the above-noted character in such manner that the printed reproduction, as a third effect, will be corrected to eliminate the degraded appearance described above.

Yet another object of the invention is to provide a mode of reproduction of the above-noted character wherein the correction for degrading is rendered a function of the purity of the color.

A further object of the invention is to provide reproduction of the above-noted character which is characterized by at least two of the above-noted correction effects.

These and other objects are realized according to the invention by developing from the color signals a single signal representing, to an approximation, the integrated visual brightness of the original color from which the color signals are derived, distorting the amplitude of the said brightness signal at low amplitudes so that the amplitude-intensity characteristic thereof has a greater slope in the shadow region of the intensity scale than in the median region thereof, and combining the distorted brightness signal with the linear black signal to likewise increase the slope of the amplitude-intensity characteristic of the resultant signal in the highlight region and in the shadow region. A resultant black signal of such characteristic in its effect on the print, first, enlarges in the highlight region the rate of change of increasing ink density with decreasing light intensity to bring out the apparent detail in the highlights. Second, such signal enlarges this same rate of change in the shadow region to suppress color toning of shadows. Third, such signal provides a partial conversion on the print of a difference in purity between two otherwise similar shadow tones into a difference in density of black ink which renders distinct to the eye the different details represented by the two shadow tones.

The above-mentioned and other objects are also realized according to the invention by developing from the color signals an anti-degrading signal which is discriminatively responsible to different relative values of the color signals with respect to each other. The anti-degrading signal is added to the linear black signal, with or without the above-mentioned integrated brightness signal so that when a yellow or yellowish-red hue is reproduced on the print, the density of the black ink laid down is reduced from its linear black density value by an amount which diminishes with decreasing purity.

Referring now to Fig. 2, the apparatus, for carrying out the method (except for the portion thereof enclosed by a dotted line in the lower right-hand section of the drawing) may be like that disclosed in U. S. Patent application Serial No. 251,898, filed on October 18, 1951, in the name of William West Moe, now Patent No. 2,873,312. The disclosure of the apparatus herein has been simplified by the omission of components which are not necessary for an understanding of the invention herein.

In the apparatus an electro-optical scanner 50 analyzes the elemental areas of an original colored subject (not shown) to produce blue, green and red electric signals whose amplitudes vary directly with the intensities of blue, green and red light beams derived by scanning of the elemental areas. These signals are fed to the blue, green and red channel circuits 51, 51' and 51'' wherein the signals are converted into modulations on a high frequency carrier compressed and otherwise modified. The output signals from the circuits are conveyed by one path of flow to the color mask modulators 52, 52' and 52'' and by another path of flow to the rectifiers 53, 53', 53''. These last-named units perform three functions of which the first is to feed back the color signals in rectified form to their respectively associated channel circuits for the purpose of obtaining a variable compression in these circuits of the color signals when in the form of modulations on a high frequency carrier. The second is to provide rectified signals via the leads 54, 55, 56 which (as later described) effect a correction of the black signal. The third is to provide rectified signals by which the high frequency color signals are subjected to color masking in the modulators 52, 52', 52''. The high frequency blue color signal is masked by rectified green, the high frequency green color signal is masked (by means of a controlled rectifier circuit 57) either with rectified red alone, or in combination with rectified blue when yellow areas of the subject are scanned, and the high frequency red color signal is masked (by means of a maximum signal selector circuit 58) with the maximum one of the rectified blue, green and red signals. The necessity for such color masking has been heretofore described.

The high frequency color signals which are the outputs of the color masked modulators 52, 52', 52'' are supplied by one path of flow to the black modulators 60, 60′, 60″, and by another path of flow to the rectifiers 61, 61′, 61″. The outputs of these rectifiers are in the nature of color corrected direct current signals whose amplitudes vary directly with the intensities of the blue, green and red light beams derived from the elemental area on the original then being scanned. These rectified output signals are supplied by way of the leads 64, 65, 66 to a linear black generator 70 (later described in more detail) which develops a linear black signal as a function of the maximum one of the input signals thereto. This linear black signal is supplied by the lead 71 to the black modulators 60, 60′, 60″ to so modify the high frequency blue, green and red color signals passing therethrough that in the printing, as described, of colored inks and black ink to reproduce the original color, the densities of the colored inks are reduced from their trichromatic values as a function of the density of the black ink.

From the black modulators 60, 60′, 60″ the high frequency color signals pass through rectifiers 75, 75′, 75″ wherein the information carried by the color signals is converted back into direct current form. From thence, the color signals are applied to the inputs of direct current amplifiers 76, 76′, 76″ whose outputs respectively operate the yellow, magenta and cyan glow lamps 77, 77′, 77″. As stated, the three color separation negatives necessary to make the final print are obtained by exposing sheets of photosensitive material to these glow lamps.

In the black channel the linear black output signal from the generator 70 is supplied by way of a lead 79 to the black correction circuit 80. This black correction circuit 80 also receives by way of the leads 54, 55, 56, the rectified blue, green and red color signals before they have been color corrected. The circuit 80 also receives, by way of the leads 81, 82, two additional inputs of the rectified blue and red color signals after they have been color corrected. There are thus six inputs in all to the black correction circuit 80.

The black correction circuit develops from its inputs (in a manner soon to be described) a resultant output in the nature of a black signal incorporating corrections to the linear black in accordance with one or more of the parameters (visual brightness, dominant wavelength, and purity) of the color in the elemental area being scanned on the original subject. This resultant black signal is applied by way of lead 84 to the input of a direct current amplifier 85 whose output excites the black glow lamp 86. As stated, the black separation negative is obtained by exposing a photosensitive sheet to this glow lamp.

Figure 3:
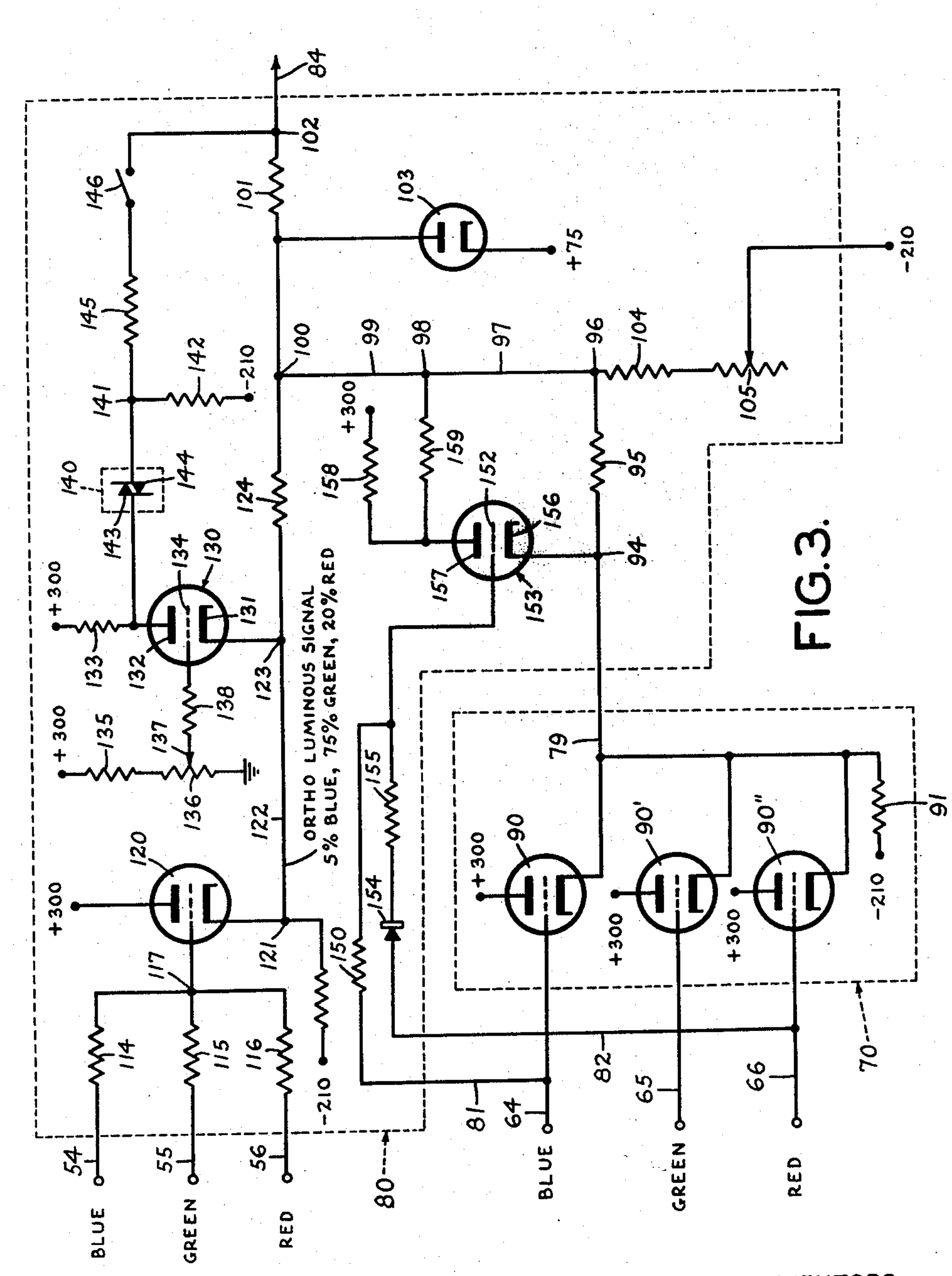
Fig. 3 is a detailed schematic diagram of a portion of the apparatus of Fig. 2.

Referring now to Fig. 3, the linear black generator 70 comprises three triodes 90, 90′, 90″ connected as cathode followers and having a common cathode resistor 91. The rectified and color corrected blue, green and red signals on, respectively, the leads 64, 65, 66 are impressed on the respective control grids of the triodes 90, 90′, 90″. The voltage developed across cathode resistor 91 is substantially equal to the maximum one of these color signals. This voltage is supplied via lead 79 as the input of the linear black signal (Fig. 4, curve I) to the black correction circuit 80. Within the circuit the linear black signal passes through junction 94, mixing resistor 95, junction 96, lead 97, junction 98, lead 99, junction 100, another mixing resistor 101, and junction 102, to appear (after having been appropriately corrected as hereafter described) upon the output lead 84 for the black correction circuit 80. The mixing resistor 95 feeds a fixed percentage of the linear black signal at the output of linear black generator 70 to the leads 97 and 99. Likewise, the resistor 101 feeds a fixed percentage of the value of this signal on leads 97, 99 to the output of the black correction circuit 80.

To prevent black signals of excessive amplitude from passing to the output lead, a limiter diode 103 has its anode coupled to junction 100 and its cathode coupled to a voltage source (not shown) which establishes that limiting shall occur at, say, 75 volts. The voltage level corresponding to the maximum amplitude excursions of the black signal is established by the serial connection of a fixed resistor 104 and a variable resistor 105 connected between the junction 96 and a negative voltage source (not shown).

Considering now the correction of the linear black signal as a function of integrated visual brightness, the leads 54, 55, 56 are connected through the respective resistors 114, 115, 116 to a common junction 117. It will be recalled that these leads respectively carry the blue, green and red color signals in rectified form before these signals have been color corrected. The resistors 114, 115, 116 are relatively proportioned in resistance value to provide for an ortholuminous weighting of the three color signals. For example, the resistors 114, 115, 116 may have respective values of 30 megohms, 1.8 megohms and 6.8 megohms. With these values, if the conductance furnished by all three resistors to junction 117 is considered as 100%, the resistors 114 will respectively furnish 5%, 75% and 20% of the total conductance. Accordingly, the signal at junction 117 will be a signal (Fig. 4, curve II) whose amplitude, to an approximation, represents the integrated visual brightness of a color scanned on the original subject. This integrated visual brightness signal will be referred to as the ortholuminous signal.

The ortholuminous signal from junction 117 passes by way of a cathode follower 120, a junction 121 at the output of the cathode follower, a lead 122, a junction 123 and a mixing resistor 124 to the junction 100 where the ortholuminous signal is additively combined with the black signal appearing at the last-named junction. The mixing resistor 124 feeds a fixed percentage of the ortholuminous signal at junction 117 to the junction 100.

Figure 4:
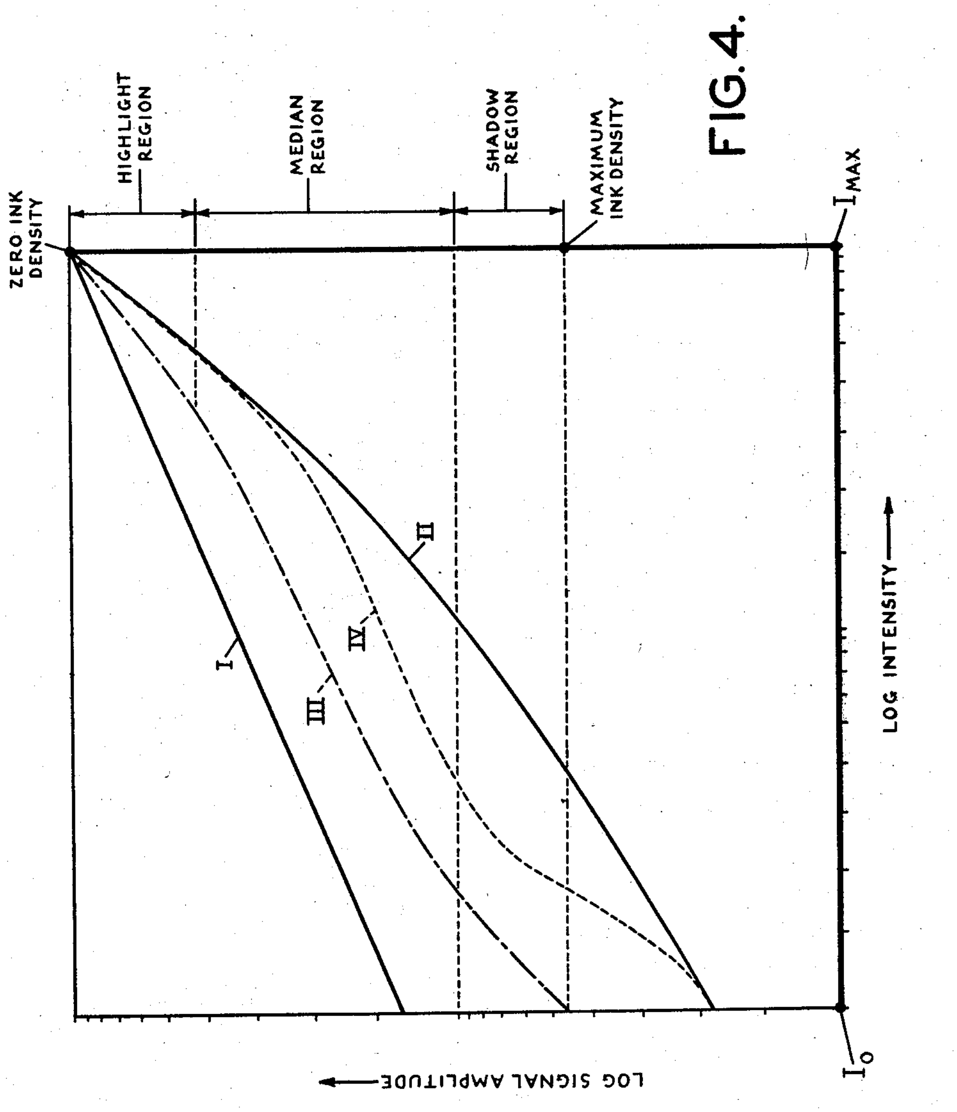
Fig. 4 is a graph of aid in explaining the method of the present invention.

As the intensity of the scanned original color drops from maximum intensity through the highlight region down to the median intensity region, the linear black signal drops off in amplitude at a slower rate than the ortholuminous signal (Fig. 4, curves I and II). This is so because the linear black signal is derived from the maximum additive color signal, the amplitude of which has been compressed by color correction, whereas the ortholuminous signal is derived from color signals which have not been color corrected and which, hence, have not been compressed. Because of the faster drop off of the ortholuminous signal, the addition thereof to the linear black signal at junction 100 serves to produce a combined black signal (Fig. 4, highlight portion of curve III) which in the highlight region has a faster rate of drop off than the linear black signal alone. Translated into terms of ink on the print, this faster drop off rate of the combined black signal will result in a deposition of black ink on the print which, as the ink density increases from zero value, has a faster rate of change of density than would black ink deposited solely as a function of the linear black signal. This increased rate of change of black ink density in the highlights is advantageous inasmuch as the extra black ink deposited restores to the highlights the apparent detail which has been lost in the color signals by color masking thereof.

To provide for compensation of the black signal in the shadow region, a triode 130 is connected as a grounded grid amplifier with its cathode 131 being connected to the junction 123 and its plate 132 being connected through a plate resistor 133 to a positive voltage supply (not shown). The grid 134 of triode 130 is biased by a network including a fixed resistor 135, a resistor 136 having a variable tap 137 and an insulating resistor 138. The resistors 135, 136 are connected between a positive voltage supply (not shown) and ground, and the isolating resistor 138 is connected between tap 137 and grid 134. Adjustment of tap 137 serves to vary the amount and cutin point of shadow boost introduced (as later described) into the ortholuminous signal.

The output of triode 130 is taken from the plate 132 thereof by a network comprising a non-linear resistor unit 140, a junction 141 and a resistor 142, the network being connected in series between the plate 132 and a negative voltage source (not shown). The resistor unit 140 may be comprised of a reverse parallel connection of resistors 143, 144 of a non-linear characteristic providing a substantially constant voltage drop across the resistors. This resistor unit 140 effects a voltage level conversion wherein the amplitude of the signal at junction 141 follows at a lower voltage level the amplitude of the signal at plate 132.

The "shadow boost" signal appearing at the junction 141 is applied by way of a mixing resistor 145 and a "shadow boost" switch 146 (when closed) to the junction 102 to be combined with the black signal appearing at this junction. The mixing resistor 145 feeds a fixed percentage of the shadow boost signal at junction 141 to junction 102.

In operation, for the highlight and medium range of intensity of the color scanned on the original, the ortholuminous signal impressed on cathode 131 of triode 130 will have a voltage sufficiently above that impressed on grid 134 of the triode to result in a cutting off of the triode. Accordingly, in the highlight and medium intensity regions the plate voltage of the triode remains at a maximum value. As the color intensity drops into the shadow region, however, the ortholuminous voltage is lowered sufficiently to cause triode 130 to conduct. Hence, at these low values, a change in the ortholuminous voltage is amplified by the triode 130 to appear as a much greater change of the same polarity in the plate voltage of the triode. This plate voltage change is communicated as the shadow boost signal to the junction 102.

The shadow boost signal when added to the resultant black signal, formed of the inflowing ortholuminous and black signals at junction 102, serves to distort this resultant signal in the sense that the ortholuminous signal component thereof has (in effect) a greater rate of change in the shadow region than in the medium intensity region. This distortion in effect of the ortholuminous signal component (Fig. 4, curve IV) gives to the resultant black signal (Fig. 4, curve III) a greater rate of change in the shadow region than in the medium intensity region. It follows that black ink laid down on the print as the function of the resultant black signal will change in density faster in the shadow region than black ink laid down as a function of the linear black signal. The extra black ink laid down in the shadow region serves to substantially eliminate the undesired color toning which would otherwise characterize certain of the reproduced shadows. Also, since differences in purity between two otherwise similarly colored areas on the original are manifested by value differences in the ortholuminous signal which are emphasized in the shadow boost signal, and since, moreover, the density of black ink laid down to reproduce shadows is in part a function of the shadow boost signal, it follows that the mentioned differences in purity are, to a considerable degree, converted into differences in black ink density. This conversion of different purity values into different black ink density values serves, with reproduced shadows, to preserve spatial details which otherwise would visually be lost.

Considering the correction of the black signal as a function of the color parameters, dominant wavelength and purity, the rectified signal representing blue after color correction is supplied from the input lead 64 for the linear black generator 70, through the lead 81 and a mixing resistor 150, to the grid 152 of a comparer triode 153. In like manner, the rectified signal representing red after color correction is supplied from lead 66, through lead 82, a rectifier 154 connected to conduct current only away from lead 66, and a mixing resistor 155 to the grid 152. The resistors 150 and 155 thus form a voltage mixing means wherein, when the voltage difference between the signals applied thereto is of one polarity only (i.e., the red signal is greater than the blue signal), the mixing means applies a signal to grid 152 representing an average weighted amplitude of the blue and red signals. The amount of weighting given each of these signals depends on the relative values of resistors 150 and 155, and may include the case where both signals are weighted the same.

The cathode 156 of comparer triode 153 is connected to junction 94 to receive the maximum one of the blue, green and red signals fed to linear black generator 70. The plate 157 of the comparer triode is connected through a plate resistor 158 to a positive voltage supply (not shown), and is also connected through a mixing resistor 159 to the junction 98 upon which appears a fraction of the linear black signal from generator 70.

For a better understanding of the operation of comparer triode 153 and the elements associated therewith, assume as the first case that the color being scanned on the original is yellow. For original yellow, the blue, green and red signals on leads 64, 65, 66 will have values which in relative terms are low, high and high, respectively. The cathode voltage for comparer triode 153 will be tied to either the voltage of the red or the green signal and will hence be high in value. Since the red signal is high and the blue signal is low, a current will flow from lead 66 through lead 82, rectifier 154, resistor 155, resistor 150, and lead 81 to lead 64. The current flow through resistor 155 produces a voltage drop on grid 152 which, in view of the relatively high voltage on cathode 156, is sufficient to cut off comparer triode 153. The plate voltage of the triode is accordingly at a maximum, and this maximum plate voltage acts through resistor 159 to add an extra increment to the linear black signal at junction 98.

As the second case, assume that the original color being scanned is red. For original red, the blue, green and red signals on leads 64, 65, 66 will have values which in relative terms are low, low and high, respectively. Under these conditions, the diode 154 will conduct so that the voltage on grid 152 is intermediate the red and blue voltages on leads 66, 64. The voltage on cathode 156 will be tied to the value of the red signal. Hence, as before, an extra increment is added at junction 98 to the linear black signal.

As the third case, assume that the original color being scanned is blue. For original blue, the blue, green and red color signals on leads 64, 65, 66 will have values which in relative terms are high, low and low, respectively. The voltage on the cathode 156 of comparer triode 153 will be high. Although the blue signal is of higher voltage than the red signal, no current flows from lead 64 to lead 66 because of the blocking effect of rectifier 154 for current flow in this direction. Accordingly, the voltage on grid 152 of triode 153 will be the voltage of the blue signal, the same voltage as that appearing on cathode 156. In this instance, the comparer triode 153 draws current to reduce the plate voltage thereof to the point where no extra increment is added to the linear black signal at junction 98.

As the fourth case, assume that the original color being scanned is purple. For original purple, the blue, green and red signals on leads 64, 65, 66 will have values which in relative terms are high, low and high, respectively. The voltage on cathode 156 will be tied to either the value of the blue signal or the red signal. Since both the blue and red signals are high, the voltage on grid 152 of triode 153 will be sufficiently high with respect to the cathode voltage of the triode to cause the triode to draw substantial current. The plate voltage of the triode is thereby reduced to a sufficiently low value so that, again, no extra increment is added to the linear black signal at junction 98.

As the fifth case, assume that the original color being scanned is neutral (i.e., black, grey or white), or, in other words, that the entire content of the color is achromatic so that there is a condition of 0% purity. For 0% purity, the blue, green and red signals on leads 64, 65, 66 will all have substantially the same value. It follows that both the cathode 156 and the grid 152 will be at substantially the same value. Under these conditions, the triode conducts, and the plate voltage thereof is reduced so that no extra increment is added to the linear black voltage.

As will be seen, the comparer triode 153 develops an anti-degrading correction signal which varies as a function of the color parameters, dominant wavelength and purity, to modify the linear black signal. With purity remaining constant, as the dominant wavelength of the chromatic content of the original color being scanned changes from blue or bluish-purple to yellow or yellowish-red, the output signal of the comparer triode rises to produce at junction 98 a combined black signal which is somewhat larger than the fraction of linear black signal reaching this junction. This increase of the black signal in yellow or yellowish-red areas results in a decrease, relative to blue or bluish-purple areas, in the amount of black ink laid down when these areas are reproduced on the print. It has been found empirically that this relative reduction of black ink in yellow or yellowish-red reproduced areas is desirable to offset the degrading effect which has been observed to otherwise occur for these particular hues.

Assume, on the other hand, that the dominant wavelength of the chromatic content of a yellow or yellowish-red original color being scanned remains constant, but that its purity value changes from a high value towards 0%. The output signal from the comparer triode 153 responsively drops off in like manner to reach zero amplitude value at the 0% purity value for the color. The consequence is that, for low purity values, the described comparer triode 153 will have little or no effect upon the amount of black ink laid down in the print. As stated, this state of affairs is desirable for the reason that at low purity values no noticeable degrading occurs, and since this factor need not be compensated for, it becomes desirable to deposit an amount of black ink which gives a good approximation to the true purity value of the original color.

The above-described embodiment being exemplary only, it will be understood that the present invention comprehends organizations differing in form or detail from the above-described embodiment. For example, the mixing resistors 95, 124, 101, 145 and 159 serve to weight the amounts of originally developed linear black signal, ortholuminous signal, shadow boost signal, and anti-degrading correction signal which are combined together. By varying the relative values of these mixing resistors it is possible to vary the relative importance of the correction signals among themselves, and to likewise vary the relative degree by which the linear black signal is modified by the correction signals. The values of the correction signals relative to each other and relative to the linear black signal may thus be proportioned to yield resultant black signals of somewhat different characteristics in order to obtain the most realistic reproduction under different reproducing circumstances. Also, the ortholuminous signal may be formed from less than all three of the color signals (as, for example, by omitting the blue signal) or from somewhat different percentages of the color signals than those specified heretofore, so long as the ortholuminous signal serves in the reproducing process to provide a useful index of the integrated visual brightness of the original color being scanned.

Accordingly, the invention is not to be considered as limited save as is consonant with the scope of the following claims.

We claim:

1. In a four color process for reproducing a colored original subject wherein the intensities of three color analyzing light beams derived from colors in scanned elemental areas of the subject are represented by the respective amplitudes of three color signals which are color corrected after being developed from said light beams, the method comprising, developing a linear black signal from that one of the color corrected signals which represents the maximum intensity light beam, developing supplementary signals from respective ones of said color signals before color correction, each supplementary signal having an amplitude which is representative of the intensity of the associated color as weighted for the relative sensitivity of the eye to that color, combining said supplementary signals to form an ortholuminous signal, distorting said ortholuminous signal to increase in magnitude the slope of the amplitude-visual brightness characteristic thereof when shadow areas are scanned, and modifying said linear black signal by the distorted ortholuminous signal to form a black signal with an amplitude-intensity characteristic having a greater magnitude slope in the shadow region than in the median intensity region.

2. A method as in claim 1 wherein said distorted ortholuminous signal also modifies the linear black signal to form a black signal with an amplitude-intensity characteristic having a greater magnitude slope in the highlight region than in the median intensity region.

3. In a four color process for reproducing a colored original subject wherein the intensities of three color analyzing light beams derived from colors in scanned elemental areas of the subject are represented by the respective amplitudes of three color signals which are color corrected after being developed from said light beams, the method comprising, developing a linear black signal from that one of the color corrected signals which represents the maximum intensity light beam, developing from at least two of said color corrected signals an additional signal which varies in amplitude as a function of the dominant wavelength of the chromatic content of the scanned original color, and modifying said linear black signal by said additional signal to form a black signal whose amplitude is partially a function of said dominant wavelength.

4. In a four color process for reproducing a colored original subject wherein the intensities of three color analyzing light beams derived from colors in sacnned elemental areas of the subject are represented by the respective amplitudes of three color signals which are color corrected after being developed from said light beams, the method comprising, developing a linear black signal from that one of the color corrected signals which represents the maximum intensity light beam, developing from at least two of said color corrected signals an additional signal which varies in amplitude as a function of the purity value of colors on said original subject, and modifying said linear black signal by said additional signal to form a black signal whose amplitude is partially a function of said purity value.

5. In a four color process wherein a colored original subject is reproduced by three subtractive color inks and black ink forming a print, and wherein the colored ink densities are determined by the respective amplitudes of blue, green and red color signals whose amplitudes represent the intensities of corresponding color analyzing light beams derived from original colors in scanned elemental areas of the subject, said signals being color corrected after being developed from said light beams, the method comprising, developing a linear black signal from that one of the color corrected signals which represents the maximum intensity light beam, developing an additional signal representing a weighted average amplitude of the color corrected blue and red signals when the difference in amplitude of said last-named signals is of one polarity only and as representative of an intensity of the color red exceeding that of the color blue, modifying said additional signal as a function of said color signal representing the maximum intensity light beam to decrease the amplitude of said additional signal when there is an approach to equality of all three of the color corrected blue, green and red signals, and combining said modified additional signal with said linear black signal to form a black signal providing for a decrease in the density of black ink forming the print as the dominant wavelength of the chromatic content of the scanned original color changes from the blue and bluish-purple hue region to the yellow and yellowish-red hue region, the amount of decrease diminishing with decreasing purity for colors with a chromatic content in the yellow and yellowish-red hue region.

6. In a four color process for reproducing a colored original subject wherein the intensities of three color analyzing light beams derived from colors in scanned elemental areas of the subject are represented by the respective amplitudes of three color signals which are color corrected after being developed from said light beams, the method comprising, developing a linear black signal from that one of the color corrected signals which represents the maximum intensity light beam, developing from said color corrected signals an additional signal which varies in amplitude both as a function of the dominant wavelength of the chromatic content and as a function of the purity of scanned original colors, modifying said linear black signal by said additional signal to form a resultant black signal whose amplitude is partially a function of said dominant wavelength and purity, developing supplementary signals from respective ones of said color signals before color correction, each supplementary signal having an amplitude which is representative of the intensity of the associated color as weighted for the relative sensitivity of the eye to that color, combining said supplementary signals to form an ortholuminous signal, distorting said ortholuminous signal to increase in magnitude the slope of the amplitude-visual brightness characteristic thereof when shadow areas are scanned, and combining said distorted ortholuminous signal with said resultant black signal to form a black signal with an amplitude intensity characteristic of greater magnitude slope in the shadow and highlight regions than in the median intensity region.

7. In a four color process wherein a colored original subject is reproduced by three subtractive color inks and black ink forming a print, and wherein the colored ink densities are determined by the respective amplitudes of blue, green and red color signals whose amplitudes represent the intensities of corresponding color analyzing light beams derived from colors in scanned elemental areas of the subject, said signals being color corrected after being developed from said light beams, the method comprising, developing a linear black signal from that one of the color corrected signals which represents the maximum intensity light beam, developing an additional signal representing a weighted average amplitude of the color corrected blue and red signals when the difference in amplitude between said last-name signals is of one polarity only and as representative of an intensity of the color red exceeding that of the color blue, modifying said additional signal as a function of said color signal representing the maximum intensity light beam, combining said modified additional signal with said linear black signal to form a resulant black signal providing for a decrease in the density of black ink forming the print as the dominant wavelength of the chromatic content of the scanned original color changes from the blue and bluish-purple hue region to the yellow and yellowish-red hue region, the amount of decrease diminishing with decreasing purity for colors with a chromatic content in the yellow and yellowish-red hue region, developing supplementary signals from respective ones of said color signals before color correction, each supplementary signal having an amplitude which is representative of the intensity of the associated color as weighted for the relative sensitivity of the eye to that color, combining said supplementary signals to form an ortholuminous signal, distorting said ortholuminous signal to increase in magnitude the slope of the amplitude-visual brightness characterstic thereof when shadow areas are scanned, and combining said distorted ortholuminous signal with said resultant black signal to form a black signal with an amplitude intensity characteristic of greater magnitude slope in the shadow and highlight regions than in the median intensity region.

8. Black signal apparatus for a four color reproducing system wherein the intensities of three color analyzing light beams derived from colors in scanned elemental areas of the subject are represented by the respective amplitudes of three color signals which are color corrected after being developed from said light beams, and wherein signal selector means is adapted to receive inputs of said three color corrected signals to provide an output of a linear black signal as a function of that one of the color corrected signals which represents the maximum intensity light beam, said apparatus comprising a plurality of signal transfer means having their outputs connected to a common electrical junction and their inputs respectively adapted to receive respective ones of said three color signals before color correction, said signal transfer means being respectively characterized by input/output amplitude ratios of preselected values of which the ratio value for each transfer means is adapted to weight the signal passing therethrough in accordance with the relative sensitivity of the eye to the color associated with such signal, said plurality of signal transfer means being thereby adapted to provide an ortholuminous signal at said junction, distortion amplifier means connected by its input to said junction to produce at its output an amplified ortholuminous signal of unreversed polarity, said amplifier means having a distortion characteristic providing different degrees of amplification when the input ortholuminous signal is derived from scanned shadow areas and other intensity areas, and a mixing network having a plurality of inputs which are, respectively, adapted to be connected to the output of said signal selector means, connected to said junction, and connected to the output of said amplifier means, said network being adapted to mix said linear black signal, ortholuminous signal and amplified ortholuminous signal to produce an output black signal with an amplitude-intensity characteristic whose slope is greater in magnitude in the highlight and shadow regions than in the median intensity region.

9. Black signal apparatus for a four color reproducing system wherein the intensities of three color analyzing light beams derived from colors in scanned elemental areas of the subject are represented by the respective amplitudes of three color signals which are color corrected after being developed from said light beams, and wherein signal selector means is adapted to receive inputs of said three color corrected signals to provide an output of a linear black signal as a function of that one of the color corrected signals which represents the maximum intensity light beam, said apparatus comprising, a plurality of resistors connected at one end to a common junction and respectively adapted at the other ends thereof to receive respective ones of said three color signals before color correction, said resistors providing to said junction a total conductance distributed among the individual conductances of said resistors to weight said received signal in a ratio which provides an ortholuminous signal at said junction, an electronic amplifying unit with control, anode, and cathode electrodes, said cathode electrode being connected to receive said ortholuminous signal, said control electrode being adapted to be connected to a static biasing voltage supply, and a mixing network having a plurality of inputs which are respectively, adapted to be connected to the output of said signal selector means, connected to said junction, and connected to said anode electrode, said network being adapted to mix its received input signals to produce an output signal with an amplitude-intensity characteristic whose slope is greater in magnitude in the highlight and shadow regions than in the median intensity region.

10. Black signal apparatus for a four color reproducing system wherein a colored original subject is reproduced by three subtractive color inks and black ink forming a print, and wherein the colored ink densities are determined by the respective amplitudes of blue, green and red color signals whose amplitudes represent the intensities of corresponding color analyzing light beams derived from colors in scanned elemental areas of the subject, said signals being color corrected after being developed from said light beams, and wherein signal selector means is adapted to receive inputs of said three color corrected signals to provide an output of a linear black signal as a function of that one of the color corrected signals which represents the maximum intensity light beam, said apparatus comprising, signal comparing means having an output and first and second inputs, said comparing means being adapted to provide at its output an anti-degrading signal as a function of the difference of the signals applied to its inputs, means for supplying said color signal representing the maximum intensity light beam to said first input, a circuit adapted to receive said blue and red color corrected signals to supply a signal representing an average weighted amplitude thereof to said second input when the amplitude difference of said blue and red corrected color signals is of one polarity only and as representative of an intensity of the color red exceeding that of the color blue, and a mixing network adapted to be connected by one input to the output of said signal selector means and connected by another input to the output of said signal comparing means, said network being adapted by mixing said linear black and anti-degrading signals to give an output black signal providing a decrease in the density of black ink forming the print as the predominant wavelength of the chromatic content of the scanned original color changes from the blue and bluish-purple hue region to the yellow and yellowish-red hue region, the amount of said decrease diminishing with decreasing purity for colors with a chromatic content in the yellow and yellowish-red hue region.

11. Black signal apparatus for a four color reproducing system wherein a colored original subject is reproduced by three subtractive color inks and black ink forming a print, and wherein the colored ink densities are determined by the respective amplitudes of blue, green and red color signals whose amplitudes represent the intensities of corresponding color analyzing light beams derived from original colors in scanned elemental areas on the subject, said signals being color corrected after being developed from said light beams, and wherein signal selector means is adapted to receive inputs of said color corrected signals to provide an output of a linear black signal as a function of that one of said color corrected signals which represents the maximum intensity light beam, said apparatus comprising, an electronic amplifying unit having control, cathode, and anode electrodes, means for connecting said color signal representing the maximum intensity light beam to said cathode electrode, voltage mixing resistor means adapted to receive said blue and red color corrected signals at the two end terminals thereof, said resistor means being connected from an intermediate point thereon to said control electrode, rectifier means connected in circuit with said resistor means in the flow path of said red signal towards said point, said rectifier means having a conduction direction permitting current flow only towards said point, a load connected to said anode electrode to provide an output thereat of an anti-degrading signal as a function of the signal inputs supplied to said cathode and control electrodes, and a mixing network adapted to be connected by one input to the output of said signal selector means and connected by another input to said anode electrode, said network being adapted by mixing said linear black and anti-degrading signals to give an output black signal providing a decrease in the density of black ink forming the print as the dominant wavelength of the chromatic content of the scanned original color changes from the blue and bluish-purple hue region to the yellow and yellowish-red hue region, the amount of said decrease diminishing with decreasing purity for colors having a chromatic content in the yellow and yellowish-red hue region.

12. Black signal apparatus for a four color reproducing system wherein a colored original subject is reproduced by three subtractive color inks and black ink forming a print, and wherein the colored ink densities are determined by the respective amplitudes of blue, green and red color signals whose amplitudes represent the intensities of corresponding color analyzing light beams derived from original colors in scanned elemental areas of the subject, said signals being color corrected after being developed from said light beams, and wherein signal selector means is adapted to receive inputs of said three color corrected signals to provide an output of a linear black signal as a function of that one of said color corrected signals which represents the maximum intensity light beam, said apparatus comprising signal comparing means having an output and first and second inputs, said comparing means being adapted to provide at its output an anti-degrading signal as a function of the difference of the signals applied to its inputs, means for supplying said color signal representing the maximum intensity light beam to said first input, a circuit adapted to receive said blue and red color corrected signals to supply a signal representing an average weighted amplitude thereof to said second input when the amplitude difference of said blue and red color corrected signals is of one polarity only and as representative of an intensity of the color red exceeding that of the color blue, a plurality of signal transfer means having their outputs connected to a common electrical junction and their inputs respectively adapted to receive respective ones of said three color signals before color correction, said signal transfer means having respective input/output amplitude ratios of preselected values of which the ratio value for each transfer means is adapted to weight the signal passing therethrough in accordance with the relative sensitivity of the eye to the color associated with such signal, said plurality of signal transfer means being thereby adapted to provide an ortholuminous signal at said junction, distortion amplifier means connected by its input to said junction to produce at its output an amplified ortholuminous signal of unreversed polarity, said amplifier means having a distortion characteristic providing different degrees of amplification when the input ortholuminous signal is derived from scanned shadow areas and other intensity areas, and a mixing network having a plurality of inputs which are, respectively, adapted to be connected to the output of said signal selector means, connected to said junction, connected to the output of said distortion amplifier, and connected to the output of said comparing amplifier means, said network being adapted to mix the signals received at its inputs to give an output black signal corrected in accordance with the color parameters, visual brightness, dominant wavelength of chromatic content, and purity.

13. Black signal apparatus for a four color reproducing system wherein a colored original subject is reproduced by three subtractive color inks and black ink forming a print, and wherein the colored ink densities are determined by the respective amplitudes of blue, green and red color signals whose amplitudes represent the intensities of corresponding color analyzing light beams derived from colors in scanned elemental areas of the subject, the signals being color corrected after being developed by said light beams, and wherein signal selector means is adapted to receive inputs of said three signals after color correction and to provide an output of a linear black signal as a function of that one of said color corrected signals which represents the maximum intensity light beam, said apparatus comprising, a first electronic amplifying unit having control, cathode and anode electrodes, means for connecting said color signal representing the maximum intensity light beam to said cathode electrode, voltage mixing resistor means adapted to receive said blue and red color corrected signals at the two end terminals thereof, said resistor means being connected from an intermediate point thereon to said control electrode, rectifier means connected in circuit with said resistor means in the flow path of said red signal towards said point, said rectifier means having a conduction direction permitting current flow only towards said point, a load connected to said anode electrode to provide an output thereat of an anti-degrading signal as a function of the signal inputs supplied to said cathode and control electrodes, a plurality of resistors connected at one end to a common junction and respectively adapted at the other ends thereof to receive respective ones of said three color signals before color correction, said resistors providing to said junction a total conductance distributed among the individual conductances of said resistors to weight their received signals in a ratio which provides an ortholuminous signal at said junction, a second electronic amplifying unit with control, anode and cathode electrodes, the cathode electrode thereof being connected to receive said ortholuminous signal and the control electrode thereof being adapted to be connected to a static biasing voltage supply, and a mixing network having a plurality of inputs which are, respectively, adapted to be connected to the output of said signal selector means, connected to said junction, connected to said anode electrode of said first electronic amplifying unit, and connected to said anode electrode of said second electronic amplifying unit, said network being adapted to mix the signals received at its inputs to form an output black signal corrected in accordance with the color parameters, visual brightness, predominant wavelength of chromatic content, and purity.

References Cited in the file of this patent

UNITED STATES PATENTS

| | | |
|---|---|---|
| 2,413,706 | Gunderson | Jan. 7, 1947 |
| 2,434,561 | Hardy | Jan. 13, 1948 |
| 2,560,567 | Gunderson | July 17, 1951 |
| 2,691,696 | Yule | Oct. 12, 1954 |
| 2,721,892 | Yule | Oct. 25, 1955 |
| 2,748,190 | Yule | May 29, 1956 |